United States Patent [19]

Kato et al.

[11] Patent Number: 4,834,507
[45] Date of Patent: May 30, 1989

[54] ACTIVE LIQUID CRYSTAL COLOR DISPLAY DEVICE HAVING BRANCHLESS SCAN ELECTRODES

[75] Inventors: Hiroaki Kato, Nara; Hirohisa Tanaka, Gose; Fumiaki Funada, Yamatokoriyama, all of Japan

[73] Assignee: Sharp Kabushiki Kaisha, Osaka, Japan

[21] Appl. No.: 243,175

[22] Filed: Sep. 8, 1988

Related U.S. Application Data

[63] Continuation of Ser. No. 830,863, Feb. 19, 1986, abandoned.

[30] Foreign Application Priority Data

Feb. 20, 1985 [JP] Japan .................................. 60-32275

[51] Int. Cl.$^4$ ........................ G02F 1/133; H01L 29/78
[52] U.S. Cl. .................................. 350/339 F; 350/334; 357/23.7
[58] Field of Search ................ 350/339 F, 332, 333, 350/334, 336; 340/784, 765, 719; 357/23.7, 45, 2

[56] References Cited

U.S. PATENT DOCUMENTS

| | | | |
|---|---|---|---|
| 4,534,623 | 8/1985 | Azaki .............................. | 350/334 |
| 4,600,274 | 7/1986 | Morozumi ....................... | 350/339 F |
| 4,678,282 | 7/1987 | Yaniv et al. ..................... | 350/334 |
| 4,704,559 | 11/1987 | Suginoya et al. ............... | 350/339 F |
| 4,705,358 | 11/1987 | Yamazaki et al. ............... | 350/334 |

FOREIGN PATENT DOCUMENTS

| | | | |
|---|---|---|---|
| 0207118 | 10/1985 | Japan ........................... | 350/333 |
| 0218626 | 11/1985 | Japan ........................... | 350/332 |
| 0218627 | 11/1985 | Japan ........................... | 350/332 |
| 2133912 | 8/1984 | United Kingdom ............. | 350/339 F |

OTHER PUBLICATIONS

A. I. Lakatos—"Promise . . . T–F Silicon Approaches to Active Matrices", pp. 185–192–Proceedings of the SID–vol. 24/2–1983.

*Primary Examiner*—Stanley D. Miller
*Assistant Examiner*—Tai V. Duong
*Attorney, Agent, or Firm*—Birch, Stewart, Kolasch & Birch

[57] ABSTRACT

A liquid crystal color display device has a substrate made of electrically non-conductive material, and a plurality of spot electrodes aligned in rows. The spot electrodes in each row are aligned with a predetermined pitch so as to provide a first predetermined space between two adajcent spot electrodes. The rows extend in a first direction parallel to each other with a second predetermined space between two adjacent rows. The spot electrodes in one row and the spot electrodes in the next row are off set by half pitch. A plurality of scan electrodes are each extending in the second predetermined space. Also, a plurality of signal electrodes are provided each defined by a first portion extending in the first predetermined space and a second portion extending in the second predetermined space with the first and second portions occurring alternately. Furthermore, a plurality of thin film transistors are provided each defined in association with the second portion.

3 Claims, 4 Drawing Sheets

ACTIVE LIQUID CRYSTAL COLOR DISPLAY DEVICE HAVING BRANCHLESS SCAN ELECTRODES

BACKGROUND OF THE INVENTION

This application is a continuation of application Ser. No. 830,863 filed on Feb. 19, 1986, now abandoned.

1. Field of the invention

The present invention relates to a liquid crystal color display device defined by a plurality of picture elements arranged in a plurality of rows in a matrix and, more particularly, to an arrangement of switching elements coupled to each picture elements.

2. Description of the Background Art

The liquid crystal color display device generally comprises a plurality of picture elements arranged in a dot matrix. Each picture element is provided with a coloring means for producing one particular color of a set of additive primary colors. Each picture element is applied with a controlled voltage to produce its assigned color at a brightness determined by the video signal. Thus, by combining the colors of the neighboring picture elements in the same principle as used in a color cathode ray tube, an image defined by any desired colors including half tone colors and natural colors can be displayed.

The prior art liquid crystal color display device has a plurality of picture elements aligned at a predetermined pitch in two orthogonal directions, e.g., horizontal and vertical directions on a transparent substrate with a plurality of straight signal electrodes extending vertically between picture elements for sending color signals to picture elements in columns and a plurality of straight scan electrodes extending horizontally between picture elements for identifying the row which is to be scanned. If the picture elements are provided at a high density, a high quality image having colors as natural as that of the original can be reproduced. However, in the case where the number of picture elements to be contained is limited, the quality of the reproduced image differs greatly depending on the manner in which the picture elements of additive primary colors are aligned. Some alignments show very poor spatial resolution in the vertical direction, resulting in undesirable moire pattern revealing on the display screen.

In consideration of the above disadvantages, an improved liquid crystal display device employing a delta alignment of the picture elements is disclosed in U.S. patent application Ser. No. 722,591 (European patent application No. 85 104 516.1) assigned to the same assignee as the present case. The delta alignment according to U.S. patent application Ser. No. 722,591 (European patent application No. 85 104 516.1) is shown in FIG. 1. Picture elements 104, actually the electrodes for such picture elements, are aligned in rows, each row extending horizontally. In each row, picture elements are aligned with a predetermined pitch P so as to provide a predetermined space S1 between two adjacent picture elements. The rows extend parallel to each other with a predetermined space (the widest is shown as S2) between each two adjacent rows. As shown in FIG. 1, the picture elements 104 in the odd rows are in off set relationship with the picture elements 104 in the even rows by a 0.5 pitch spacing of the pitch in which the picture elements are aligned horizontally. Thus, the three additive primary colors, e.g, red (R), blue (B) and green (G) are disposed closely adjacent to each other in a shape similar to a character "delta".

To drive each picture element, a plurality of straight scan electrodes 101 are provided, each extending along the upper side of each row of picture elements. Also provided are a plurality of signal electrodes 102 each defined by vertically extending portions 102v and horizontally extending portions 102h appearing alternately. As illustrated in FIG. 1, the vertically extending portions 102v are located in a space between two picture elements aligned horizontally, and the horizontally extending portions 102h are located in a space between two picture elements in two adjacent rows. Each scan electrode 101 has branch electrodes 101b each extending in a space between two picture elements aligned horizontally. The branch electrode 101b partly overlaps with the vertically extending portion 102v and partly overlaps with a drain electrode 103 which further overlaps partly with an electrode defining the picture electrode, so as to form a thin film transistor at a space between two picture elements aligned horizontally. The thin film transistors are formed on the right and left sides alternately of the signal electrode 102 so that each signal electrode carries one particular color signal.

The delta alignment of the picture elements as described above has a problem in that relatively large spaces are occupied by electrodes 101 and 103, resulting in less space remaining for placing the picture elements, which inevitably results in reduction of brightness of the image on the screen. More specifically, a thin film transistor requires a relatively wide space between picture elements 104; and scan electrode 101 and horizontally extending portion 102h, which are positioned side-by-side, occupy a relatively large space between picture elements in two rows. The reduction of available space for the picture elements becomes greater as the number of picture element increases.

To solve the above problem, one may conclude that the width of scan electrode 101 and horizontally extending portion 102h might be narrowed. However, this results in the increase of the ohmic resistance of the electrodes, thereby undesirably weakening the signal.

Also, it is possible to place horizontally extending portion 102h over scan electrode 101 to increase the space for the picture element. However, the overlap structure of the electrodes 102h and 101 results in the increase of the capacitance between the two electrodes 102h and 101, which adversely affects the signal transmitted through signal electrode 102.

SUMMARY OF THE INVENTION

The present invention has been developed with a view to substantially solving the above described disadvantages and has for its essential object to provide an improved liquid crystal color display device having an improved electrode arrangement to increase the area available for the picture elements.

In accomplishing these and other objects, a liquid crystal color display device according to the present invention has the thin film transistor formed in association with the horizontally extending portion of the scan electrode.

The arrangement according to the present invention will result in the increase of the percentage of the area to be occupied by the picture elements over the entire screen.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Figure 4:
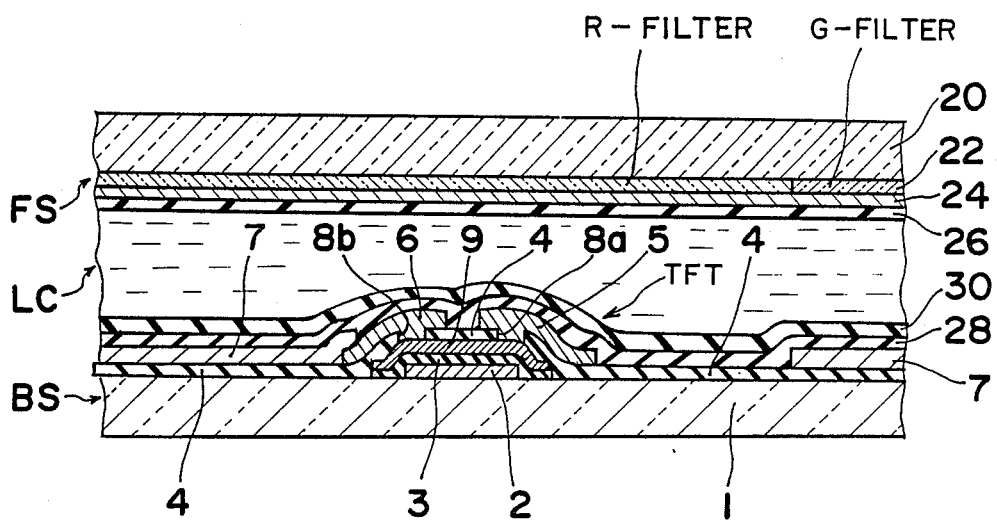
FIG. 4 is a cross-sectional view taken along a line IV—IV shown in FIG. 3.

Referring to FIG. 4, a liquid crystal color display device according to the present invention comprises a base structure BS, a filter structure FS facing parallel to base structure BS with a predetermined space held between structures BS and FS by a suitable spacing means (not shown), and liquid crystal LC filled in the space between structures BS and FS. Filter structure FS is defined by a glass plate 20, a color filter 22 deposited on glass plate 20 in a mosaic pattern of additive primary colors, a common electrode 24 for operating each picture element, and orientation film 26. The present invention is particularly directed to base structure BS, which is described in detail below.

Figure 2:
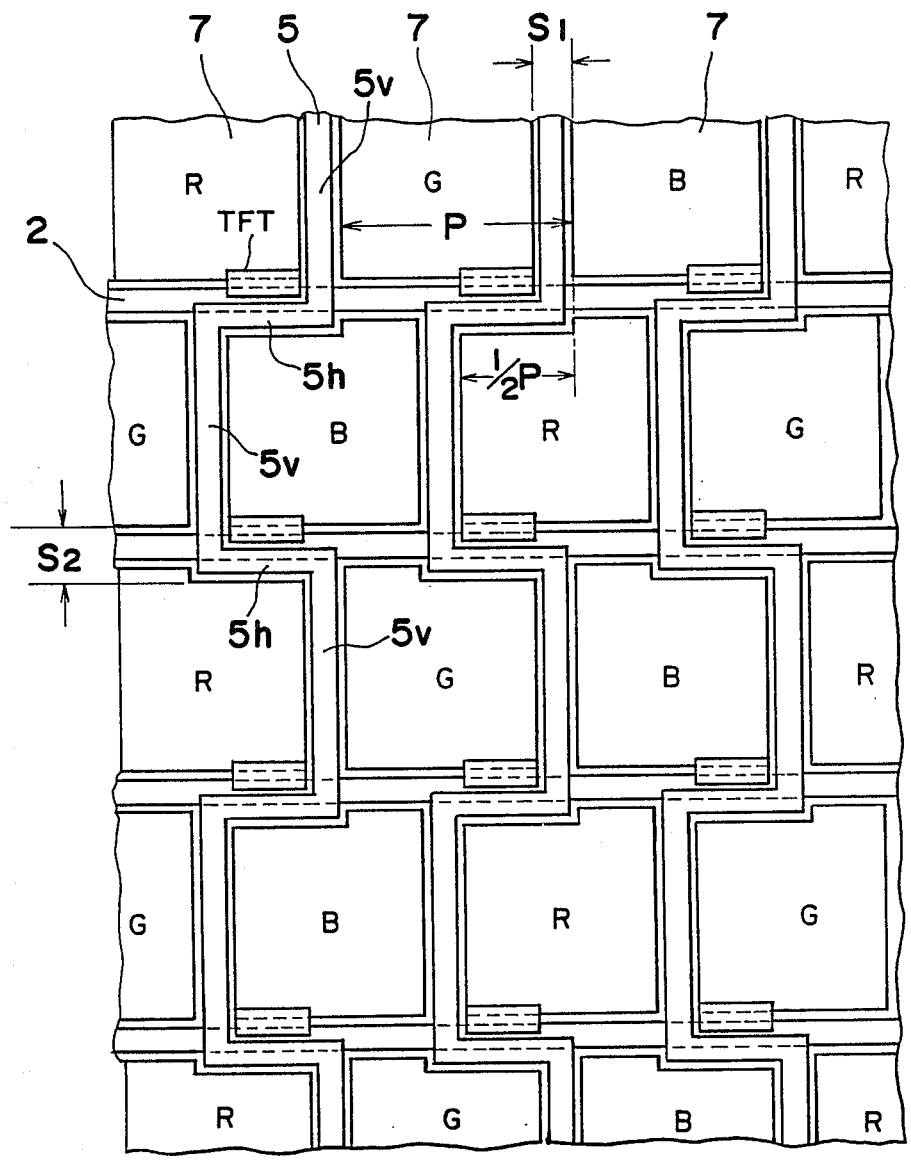
FIG. 2 is a fragmentary top plan view of a liquid crystal color display device of the present invention.

Referring to FIG. 2, base structure BS of the liquid crystal colo display device according to the present invention comprises a transparent or opaque substrate 1 made of electrically non-conductive material, such as glass (e.g., #7059 of Corning Co., U.S.A or NA 40 of HOYA Co., Japan) or synthetic resin. Deposited on substrate 1 are a plurality of transparent or opaque electrodes 7 for defining picture elements, scan electrodes 2 and signal electrodes 5. Electrodes 7 are referred to as spot electrodes, whereas scan electrodes 2 and signal electrodes are referred to as line electrodes.

Spot electrodes 7 are aligned in rows, each row extending horizontally. In each row, the spot electrodes are aligned with a predetermined pitch P so as to provide a predetermined space S1 between two adjacent spot electrodes 7. The rows extend parallel to each other with a predetermined space (the widest is shown as S2) between two adjacent rows. Spot electrodes 7 in one row and spot electrodes 7 in the next row are offset by half pitch ½P. In FIG. 2, characters R, B and G, representing additive primary colors red, blue and green, respectively, are given, merely as an example, so as to show the color which is assigned to each spot electrode. Actually, the colors are added to filter structure FS at areas corresponding to the spot electrodes. Since the additive primary colors of one set (R, G and B) are located in a shape similar to a triangle, such an arrangement of the spot electrodes, i.e., the picture elements, is called a delta arrangement.

Scan electrodes 2 are formed at spaces S2, respectively, each extending straight. Each signal electrode 5 is defined by vertically extending portions 5v and horizontally extending portions 5h appearing alternately. As illustrated in FIG. 2, the vertically extending portions 5v are located in space S1, and the horizontally extending portions 5h are located in space S2.

According to the present invention, a thin film transistor TFT is formed in association with each horizontally extending portion 5h. The structure and the steps for making the thin film transistor TFT will be described below.

Figure 3:
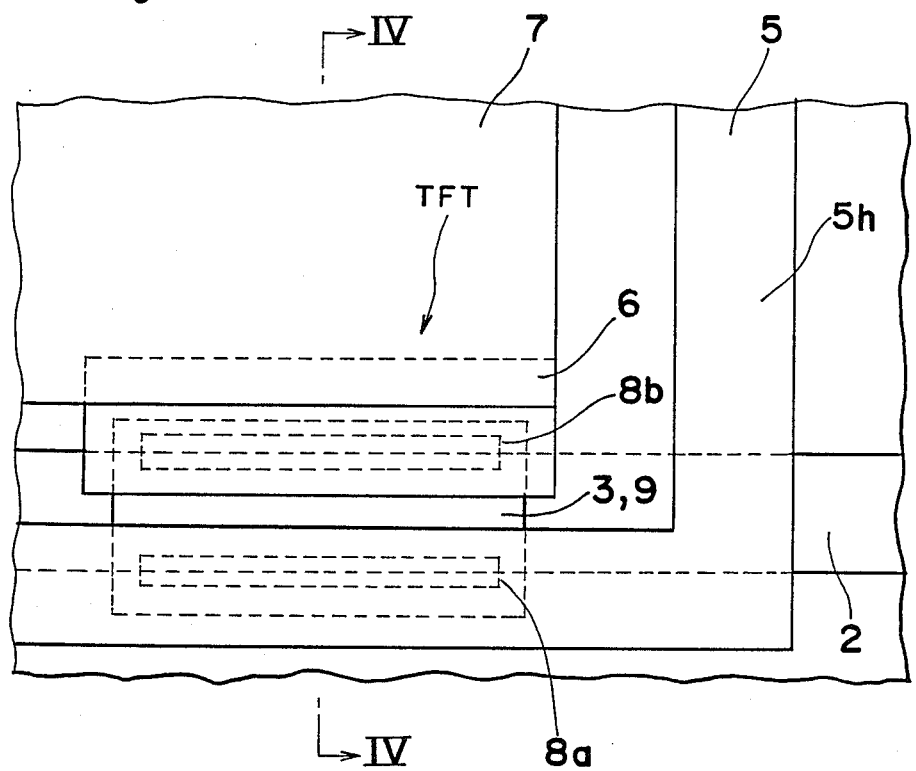
FIG. 3 is a fragmentary top plan view, in an enlarged scale, of the liquid crystal color display device of FIG. 2, particularly showing the structure of a thin film transistor.

As shown in FIGS. 3 and 4, first, scan electrode 2, e.g., made of tantalum (Ta) is deposited on substrate 1. A portion of scan electrode 2 serves as a gate electrode of thin film transistor TFT. Then, a gate insulation film 3 made of, e.g., $Si_3N_4$ and having a thickness of 2000Å is deposited across scan electrode 2. Thereafter, a semiconductor film 9 is provided on gate insulation film 3 by way of glow discharge of $SiH_4$ forming a 2000Å thick layer of silicone hydrogen allow (a-SiH). Then, an insulation layer 4 made of, e.g., $Si_3N_4$ with a thickness of 5000Å is deposited so as to cover the entire scan electrode 2 and the double layer of films 3 and 9. A pair of elongated openings 8a and 8b are formed aong opposite side portions of the semiconductor film 9, respectively. Then, signal electrode 5, which will serve as a source electrode, is deposited using titanium in such a manner as to overlap insulation layer 4 covering only opening 8a so that signal electrode 5 directly contacts semiconductor layer 9 through opening 8a. A patch electrode 6, serving as a drain electrode, is deposited, in a similar manner using titanium, over insulation layer 4 covering only opening 8b so that drain electrode 6 directly contacts semiconductor layer 9 through opening 8b. Then, spot electrode 7 is formed by depositing ITO in such a manner as to make a portion of spot electrode 7 overlap with a portion of drain electrode 6, in a manner shown in FIG. 4. Thereafter, a protection layer 28 and an orientation film 30 are deposited entirely on base structure BS.

In operation, when a positive voltage is applied to scan electrode 2, electrons in semiconductor film 9 are shifted toward gate insulation layer 3 thereby defining a layer of electrons near the bottom face of semiconductor film 9 which is held in contact with gate insulation layer 3. Thus, an ohmic resistance between signal electrode (source electrode) 5 and drain electrode 6 is changed.

According to the liquid crystal color display device of the present invention, since only signal electrode 5, particularly vertical portion 5v, extends through the space S1 between spot electrodes 7, the space S1 can be narrowed, when compared with the prior art arrangement which has the thin film transistor formed in association with the vertical portion.

Furthermore, according to the present invention, since the thin film transistor is formed in the space S2 using a part of signal electrode 5, particularly horizontal portion 5h, and a part of scan electrode 2, electrodes 5 and 2 can be arranged in a partly overlapped manner, thereby requiring less space between the rows.

Figure 1:
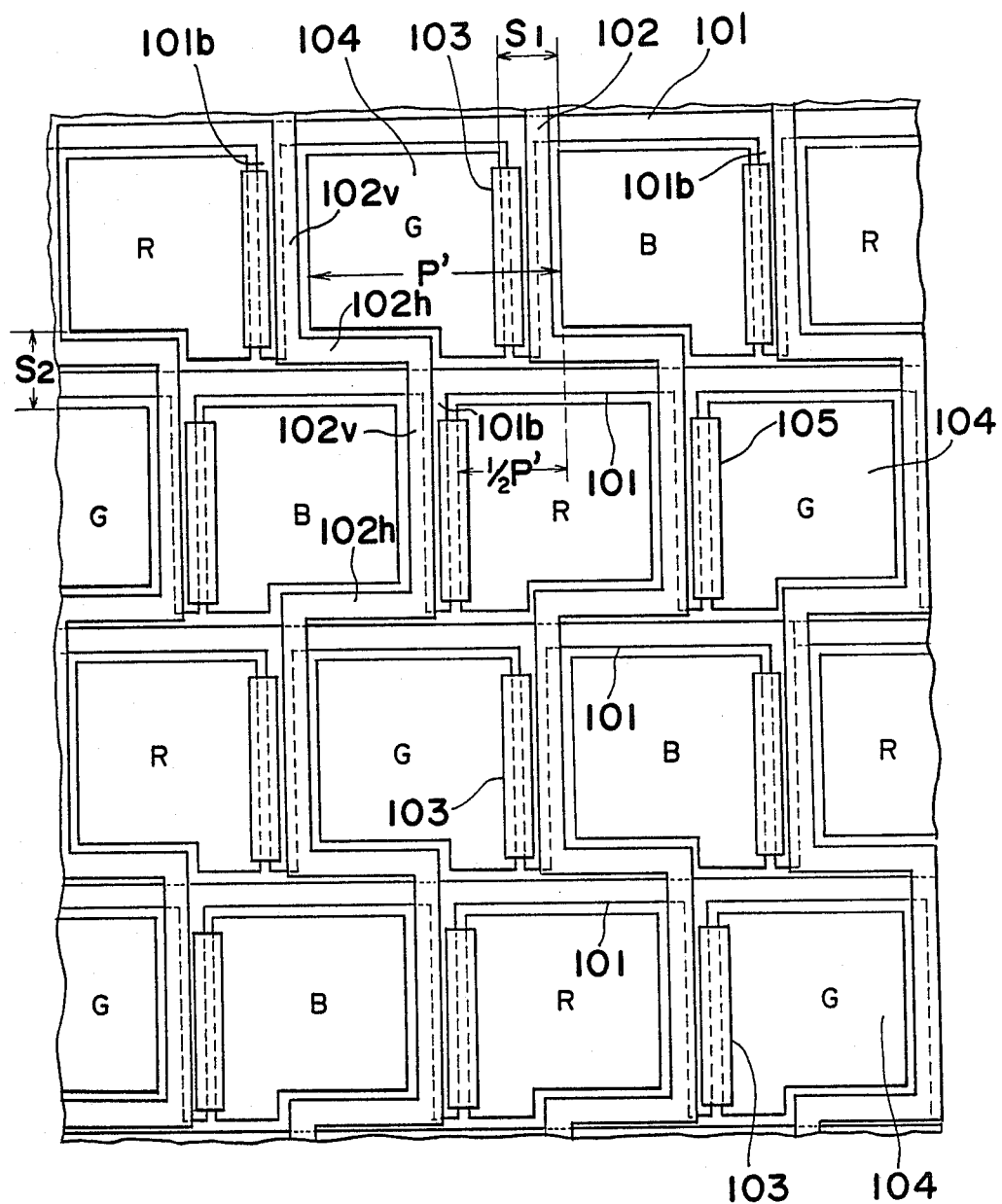
FIG. 1 is a fragmentary top plan view of a liquid crystal color display device disclosed in a prior patent application assigned to the same assignee as the present application.

Accordingly, in total, the area for depositing the spot electrodes 7 can be increased, thereby making it possible to provide a brighter image on the screen. For example, in the case where there are 3000 picture elements contained in a square centimeter, the area for depositing spot electrodes 7 for the picture elements can be increased 15%, when compared with the alignment shown in FIG. 1. The percentage can be increased more, as the number of picture elements increases.

Also, since there is no substantial increase in the overlapping area between the signal and scan electrodes, the capacitance therebetween will not increase.

Also, it is not necessary to provide any branch electrode to each scan electrode.

Figure 5:
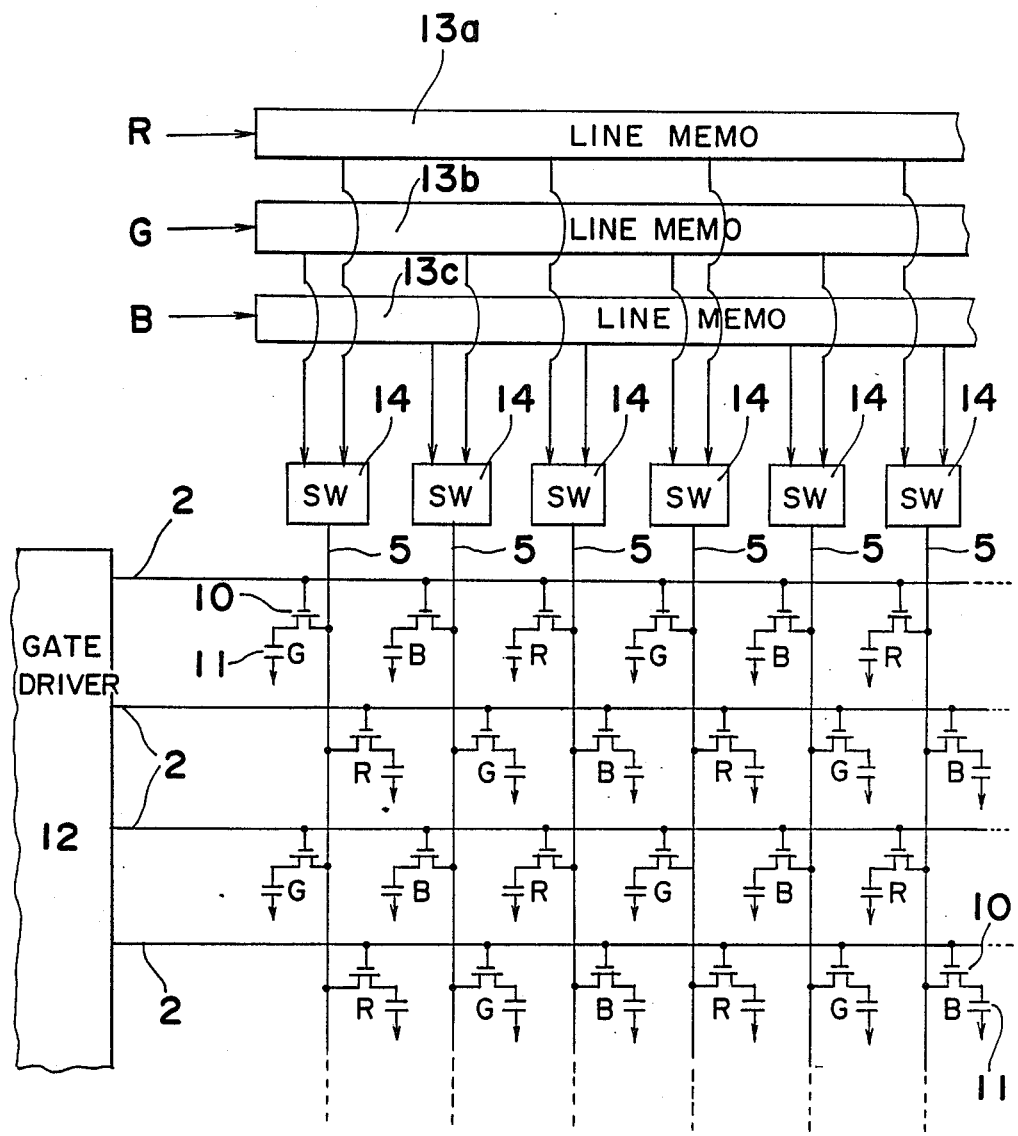
FIG. 5 is a circuit diagram for driving the liquid crystal color display device of the present invention.

Referring to FIG. 5, a circuit for driving the liquid crystal color display device of FIG. 2 is shown. In the drawing, each capacitor 11 represents the capacitance between spot electrode 7 and common electrode 24, between which the liquid crystal is filled. The arrow indicates that common electrodes 24 are connected to each other. Each scan electrode 2 (gate line) is connected to the gates of thin film transistors TFT formed along the scan electrode. Also, each signal electrode 5 (data line) is connected to the sources of the thin film transistors TFT formed alternately on the right and left sides of the signal electrode. A gate driver 12 defined by a shift registers provides a scan pulse (horizontal sync pulse) to scan electrodes 2, one at a time sequentially from top to bottom. Thus, the thin film transistors connected to the scan electrode now receiving the scan pulse are enabled to transmit the video signals from the corresponding signal electrodes to the corresponding spot electrodes.

Three analog line memories 13a, 13b and 13c are provided for storing the 1H line length video signal in the separated colors of red, green and blue, respectively. The video signals sampled and stored in the line memories are fed through a switching circuit 14 to each signal electrode. Since the first signal electrode 5 shown at the most left hand side in FIG. 5 is connected to green and red picture elements, alternately, the first switching circuit 14 is connected to red and green line memories 13a and 13b. In a synchronized relationship with the scan pulse, switching circuit 14 alternately connects the signal electrode 5 with red and green line memories 13a and 13b. Thus, when the top horizontal scan electrode 2 is receiving a scan pulse, switch 14 connects signal electrode 5 with line memory 13b to provide green video signal, thereby producing a green light from the top left corner picture element at the intensity corresponding to the green video signal. In this manner, the picture elements emit light sequentially from top to bottom.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A liquid crystal color display device comprising:
   a substrate of electrically non-conductive material;
   a plurality of spot electrodes aligned in rows, with said spot electrodes in each row being aligned with a predetermined pitch so as to provide a first predetermined space between two adjacent spot electrodes, and said rows extending in a first direction parallel to each other with a second predetermined space between two adjacent rows with said spot electrodes in one row and said spot electrodes in the next row being offset by half pitch;
   a plurality of branchless continuous strip scan electrodes each extending in said second predetermined space;
   a plurality of branchless continuous strip signal electrodes each defined by first portions extending in said first predetermined spaces and second portions extending in said second predetermined spaces with said first and second portions occurring alternately; and
   a plurality of thin film transistors each associated with said second portion each said thin film transistor including,
   a gate electrode formed of a portion of said branchless continuous strip scan electrode within said second predetermind space,
   a source electrode formed of at least a part of said second portion of said branchless continuous strip signal electrode within said second predetermined space,
   a semiconductor active region lying within said second predetermined space, and
   a drain electrode formed between said semiconductor active region and said spot electrode within said second predetermined space.

2. The display device of claim 1 wherein said semiconductor active region extends along said second predetermined space between said source and drain electrodes.

3. The display device of claim 2 wherein each said transistor lies substantially within said second predetermined space.

* * * * *